(12) United States Patent
Matsutani

(10) Patent No.: US 11,793,603 B2
(45) Date of Patent: Oct. 24, 2023

(54) DENTAL FILE

(71) Applicant: MANI, INC., Tochigi (JP)

(72) Inventor: Kazuhiko Matsutani, Tochigi (JP)

(73) Assignee: MANI, INC., Tochigi (JP)

( * ) Notice: Subject to any disclaimer, the term of this patent is extended or adjusted under 35 U.S.C. 154(b) by 172 days.

(21) Appl. No.: 17/306,211

(22) Filed: May 3, 2021

(65) Prior Publication Data

US 2022/0039915 A1 Feb. 10, 2022

(30) Foreign Application Priority Data

Aug. 7, 2020 (JP) .................................. 2020-135040

(51) Int. Cl.
*A61C 5/42* (2017.01)

(52) U.S. Cl.
CPC ...................................... *A61C 5/42* (2017.02)

(58) Field of Classification Search
CPC ....................................................... A61C 5/42
See application file for complete search history.

(56) References Cited

U.S. PATENT DOCUMENTS

| | | | | | |
|---|---|---|---|---|---|
| 4,934,934 A | * | 6/1990 | Arpaio, Jr. | ............... | A61C 5/42 433/102 |
| 5,106,298 A | * | 4/1992 | Heath | ...................... | A61C 5/42 433/102 |
| 5,713,736 A | * | 2/1998 | Heath | ...................... | A61C 5/42 408/230 |
| 5,735,689 A | * | 4/1998 | McSpadden | ............. | A61C 5/42 433/102 |
| 5,984,679 A | * | 11/1999 | Farzin-Nia | ............... | A61C 5/42 433/102 |
| 6,074,209 A | * | 6/2000 | Johnson | .................... | A61C 5/44 433/102 |
| 6,149,501 A | * | 11/2000 | Farzin-Nia | ............... | A61C 5/42 451/48 |
| 6,299,445 B1 | * | 10/2001 | Garman | ................ | B24B 19/022 433/102 |
| 6,514,076 B1 | * | 2/2003 | Bleiweiss | ................ | A61C 5/42 433/102 |
| 6,702,579 B1 | * | 3/2004 | Hoppe | ...................... | A61C 5/42 433/102 |
| 7,665,212 B2 | * | 2/2010 | Lewis | ........................ | B21J 9/06 433/165 |

(Continued)

FOREIGN PATENT DOCUMENTS

| | | | | |
|---|---|---|---|---|
| JP | 6370373 B2 | | 8/2018 | |
| KR | 101569202 B1 | * | 11/2015 | ............... A61C 5/42 |

*Primary Examiner* — Nicholas D Lucchesi
*Assistant Examiner* — Hao D Mai
(74) *Attorney, Agent, or Firm* — Pearne & Gordon LLP

(57) ABSTRACT

A dental file includes a working portion having a spiral shape, wherein a cross section perpendicular to a longitudinal direction of the working portion has a trapezoidal shape including an upper bottom, a lower bottom, and first and second oblique sides, vertexes at both ends of the lower bottom are located on an imaginary circle having a center at an axis in the longitudinal direction of the working portion, vertexes at both ends of the upper bottom are located inside the imaginary circle, and the imaginary circle has a diameter decreasing from a base end portion toward a leading end portion of the working portion.

4 Claims, 5 Drawing Sheets

(56) References Cited

U.S. PATENT DOCUMENTS

| | | | | |
|---|---|---|---|---|
| 2002/0119418 | A1* | 8/2002 | Matsutani | A61C 5/42 |
| | | | | 433/102 |
| 2003/0068597 | A1* | 4/2003 | Garman | B24B 19/04 |
| | | | | 433/102 |
| 2003/0199236 | A1* | 10/2003 | Aloise | C22F 1/006 |
| | | | | 451/48 |
| 2004/0023186 | A1* | 2/2004 | McSpadden | A61C 5/42 |
| | | | | 433/102 |
| 2004/0131993 | A1* | 7/2004 | Rouiller | A61C 5/42 |
| | | | | 433/102 |
| 2004/0185414 | A1* | 9/2004 | Badoz | A61C 5/42 |
| | | | | 433/102 |
| 2004/0191723 | A1* | 9/2004 | Shearer | A61C 5/42 |
| | | | | 433/102 |
| 2004/0219485 | A1* | 11/2004 | Scianamblo | A61C 5/42 |
| | | | | 433/102 |
| 2005/0100859 | A1* | 5/2005 | Graybill | B23H 5/06 |
| | | | | 433/102 |
| 2005/0282109 | A1* | 12/2005 | Hagemann | A61C 5/42 |
| | | | | 433/102 |
| 2006/0216668 | A1* | 9/2006 | Scianamblo | A61C 5/42 |
| | | | | 433/102 |
| 2006/0228668 | A1* | 10/2006 | McSpadden | A61C 5/42 |
| | | | | 433/102 |
| 2006/0265858 | A1* | 11/2006 | McSpadden | A61C 5/42 |
| | | | | 29/557 |
| 2007/0178426 | A1* | 8/2007 | Brock | A61C 5/42 |
| | | | | 433/102 |
| 2015/0216624 | A1 | 8/2015 | Shotton et al. | |
| 2015/0320517 | A1* | 11/2015 | Rota | A61C 5/40 |
| | | | | 433/102 |
| 2017/0209236 | A1* | 7/2017 | Scianamblo | A61C 5/40 |

\* cited by examiner

DENTAL FILE

CROSS-REFERENCE TO RELATED APPLICATION

This application claims priority from Japanese Patent Application No. 2020-135040 filed with the Japan Patent Office on Aug. 7, 2020, the entire content of which is hereby incorporated by reference.

BACKGROUND

1. Technical Field

An embodiment of the present disclosure relates to a dental file.

2. Description of Related Art

As a dental root canal cutting tool used for enlarging and cleaning root canals in dental treatment, there is a reamer or a file. A reamer is mainly rotated thereby to cut an inside of a root canal. A file is rotated or pushed and pulled in an axial direction thereby to cut an inside of a root canal.

Types of a general dental file contain that used with the gripping portion gripped by a hand and that used with the gripping portion connected to a dental hand piece. A dental file includes a working portion, a shaft, and a gripping portion. A working portion has a spiral shape and thins toward the leading end. A shaft is disposed continuously to the rear end of the working portion. A gripping portion is disposed continuously to the rear end of this shaft. Principal capabilities required of such a dental file are, for example, flexibility to enable following a root canal having a complicated shape, cutting properties to enable appropriate cutting of a root canal, and breakage resistance to suppress breakage during work. When these capabilities are higher, formation of a root canal can be performed more easily and quickly, which reduces burdens of the practitioner and the patient.

The cross-sectional shape of such a dental file is, for example, a parallelogram (for example, see Japanese Patent No. 6370373).

SUMMARY

A dental file according to the present embodiment includes a working portion having a spiral shape, wherein a cross section perpendicular to a longitudinal direction of the working portion has a trapezoidal shape including an upper bottom, a lower bottom, and first and second oblique sides, vertexes at both ends of the lower bottom are located on an imaginary circle having a center at an axis in the longitudinal direction of the working portion, vertexes at both ends of the upper bottom are located inside the imaginary circle, and the imaginary circle has a diameter decreasing from a base end portion toward a leading end portion of the working portion.

DETAILED DESCRIPTION

Figure 1:
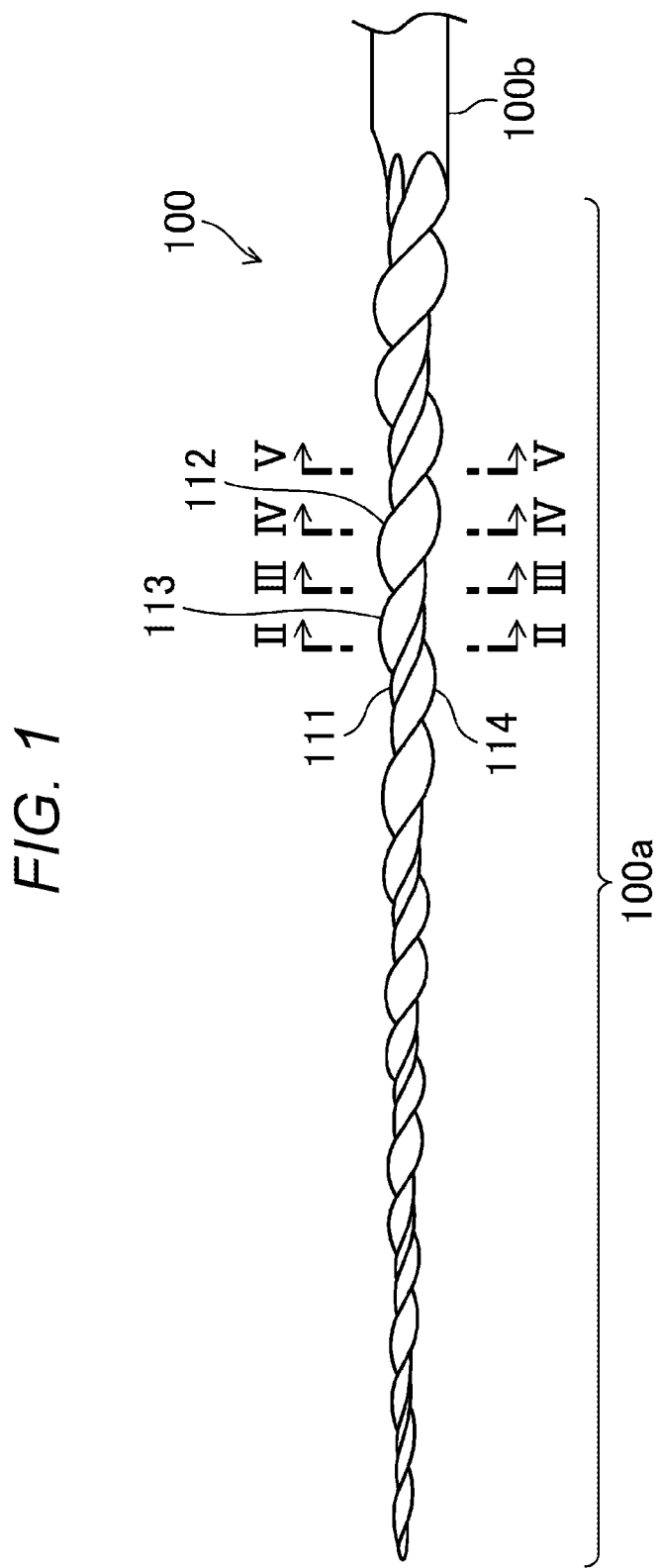
FIG. 1 is a plan view of a dental file according to a first embodiment.
Figure 2:
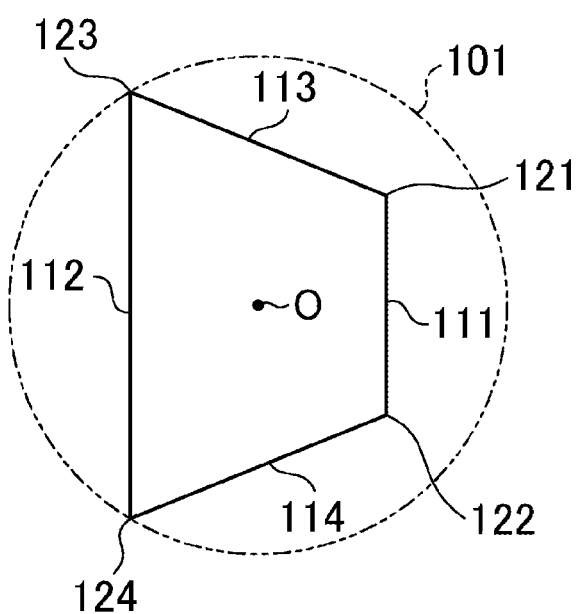
FIG. 2 is a cross-sectional view along line II-II of FIG. 1.
Figure 3:
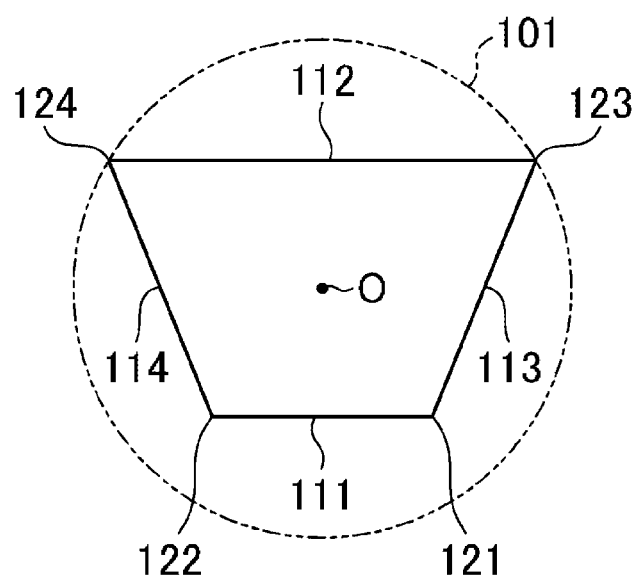
FIG. 3 is a cross-sectional view along line III-III of FIG. 1.
Figure 4:
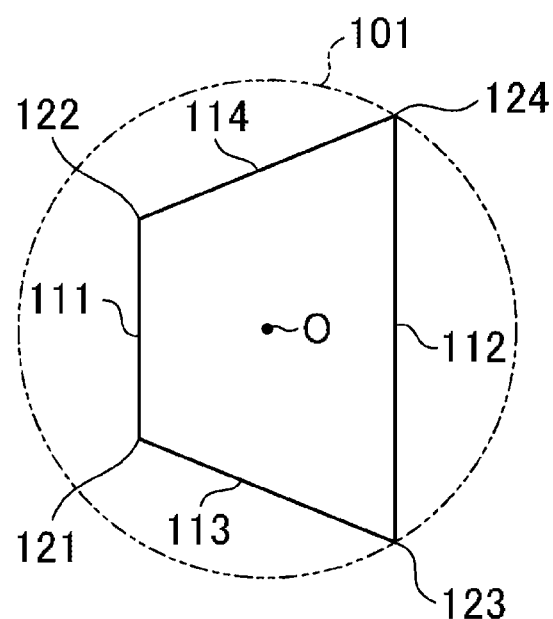
FIG. 4 is a cross-sectional view along line IV-IV of FIG. 1.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to enhance flexibility, cutting properties, and/or breakage resistance of a dental file.

A dental file according to an aspect of the present disclosure (this dental file) includes a working portion having a spiral shape, wherein a cross section perpendicular to a longitudinal direction of the working portion has a trapezoidal shape including an upper bottom, a lower bottom, and first and second oblique sides, vertexes at both ends of the lower bottom are located on an imaginary circle having a center at an axis in the longitudinal direction of the working portion, vertexes at both ends of the upper bottom are located inside the imaginary circle, and the imaginary circle has a diameter decreasing from a base end portion toward a leading end portion of the working portion.

In the present dental file, vertexes of two acute angle portions which are located on an imaginary circle and significantly affect cutting are not located on a diagonal. Due to this fact and to the fact that a vertex on a diagonal of each acute angle portion is located inside the imaginary circle, elongation and breakage caused by engaging and locking can be easily suppressed.

According to the present dental file, flexibility, cutting properties, and/or breakage resistance of a dental file can be enhanced.

Hereinafter, embodiments of the present disclosure will be described in detail based on the drawings. It is noted that in the following embodiments and variations, constituents having a similar function are assigned with the same reference numeral, and descriptions thereof are omitted.

First Embodiment

As illustrated in FIG. 1, a dental file 100 includes a working portion 100a to cut a root canal, a shaft 100b disposed continuously to the rear end of this working portion 100a, and an unillustrated gripping portion. The gripping portion is disposed continuously to the rear end of this shaft 100b and is to be attached to a dental hand piece. An example of a material of the dental file 100 is, but not particularly limited to, highly elastic nickel titanium which is suitable for a treatment of a root canal having a complicatedly curved shape. Other examples of a material of the dental file 100 include stainless materials, various alloys, and plastics.

The working portion 100a of the dental file 100 has a tapered shape in which an envelope surface as the outer surface decreases in area toward the leading end, and is configured such that cross sections having similar shapes are formed in a spiral manner. More particularly, cross-sectional shapes of cross sections perpendicular to a longitudinal direction in the working portion 100a are, for example, trapezoids as illustrated in FIG. 2 to FIG. 5. FIG. 2 to FIG. 5 are cross-sectional views along line II-II to V-V of FIG. 1 respectively. That is, the above-described cross-sectional shapes each have an upper bottom 111 and a lower bottom 112 both parallel to each other as well as a first oblique side 113 and a second oblique side 114. The first oblique side 113 and the second oblique side 114 are linked to vertexes 121 to 124 at both ends of the upper bottom 111 and the lower bottom 112.

As illustrated in FIG. 2 to FIG. 5, the vertexes 123 and 124 at both ends of the lower bottom 112 are configured so as to be located on an imaginary circle 101 having a center O at an axis in the longitudinal direction of the dental file 100. Furthermore, the vertexes 121 and 122 (vertexes on diagonals of acute angle portions) at both ends of the above-described upper bottom 111 are located on or inside the imaginary circle 101. The diameter of the imaginary circle 101 is set so as to decrease from the base end portion of the working portion 100a toward the leading end portion. Here, the upper bottom 111, the lower bottom 112, and the oblique sides 113 and 114 may not be necessarily an accurate straight line, and, for example, may be curved to some degree. Even in such a case, operations and effects as described below can be obtained. Here, in FIG. 2 to FIG. 5, the cross sections of the working portions 100a are conveniently drawn with such a scale that the imaginary circles 101 have identical diameters.

When a trapezoidal cross section is adopted as the cross section of the working portion 100a as described above, the following effects can be obtained. That is, in this case, the vertexes 123 and 124 in two acute angle portions, which are located on the imaginary circle 101 and significantly affect cutting, are not located on one diameter of the imaginary circle 101 (not located on one straight line including the center O of the imaginary circle 101). Accordingly, elongation and breakage caused by engaging and locking can be easily suppressed.

Also, higher cutting properties can be easily imparted to the vertexes 123 and 124. Therefore, the dental file 100 is likely to smoothly move through a root canal without strong pressing, and is therefore unlikely to deviate from a root canal. That is, since the dental file 100 does not need to be forcibly pressed, the dental file 100 can be easily prevented from deviating outside of a curved root canal. In this manner, the dental file 100 is formed such that cross sections of the working portion 100a have trapezoidal shapes. Accordingly, for example, a balance can be easily struck between achievement of high cutting properties by acute angle portions similarly to when the cross section of the working portion 100a has a parallelogram shape and unlikeliness of locking due to the fact that the above-described two acute angle portions are not located on one diameter of the imaginary circle 101.

Furthermore, for example, since stiffness of the working portion 100a can be maintained high while a grindstone is pressed against to perform blade groove processing of the working portion 100a, stable processing is facilitated. That is, a cross section having the shape of the imaginary circle 101 of the working portion 100a before processing is firstly cut thereby to form the portion of the lower bottom 112. In this case, an outer diameter portion of the imaginary circle 101 opposite the cut portion (on a side to become the upper bottom 111) can be subject to a pressing force of a grindstone. Furthermore, in forming the portions of the upper bottom 111 and the oblique sides 113 and 114, sides opposite these portions can be easily subject to a pressing force of a grindstone by the vertexes 123 and 124. In this manner, easier blade groove grinding and higher blade groove grinding accuracy can be easily achieved.

Second Embodiment

Figure 6:
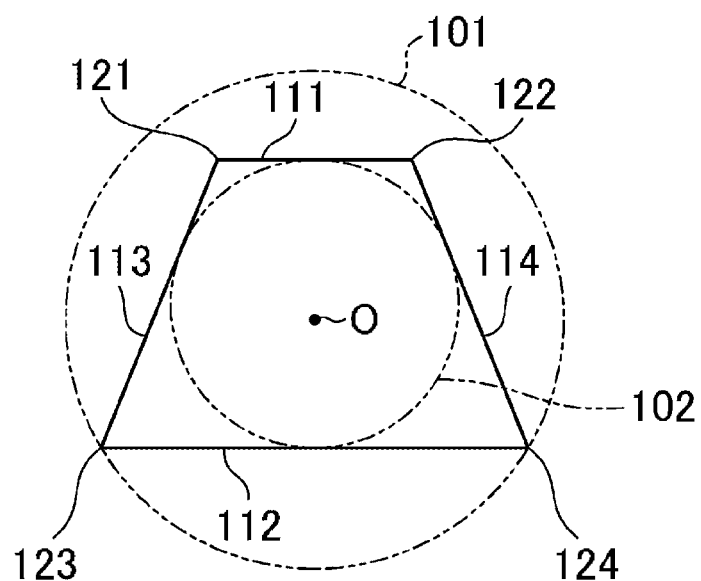
FIG. 6 is a view, in a second embodiment, corresponding to the cross section along line V-V of FIG. 1.

Positions, or distances from the center O, of the upper bottom 111, the lower bottom 112, and the oblique sides 113 and 114, which form the above-described trapezoidal shape, can be variously set. For example, as illustrated in FIG. 6, these distances may be set so as to be substantially equal to each other (such that each side contacts an incircle 102). In this case, a blade groove insertion amount in grinding is substantially identical among the sides. Therefore, grinding can be easily performed by, for example, commonly using a routine corresponding to a prescribed cut-in amount in a program to actuate a grinding machine for each side. Also, since, for example, processing is simplified, blade groove grinding can be easily performed, and blade groove grinding accuracy can be easily enhanced. It is noted that distances from the center O of two or more sides, instead of four sides, may be set so as to be substantially identical.

Third Embodiment

Figure 7:
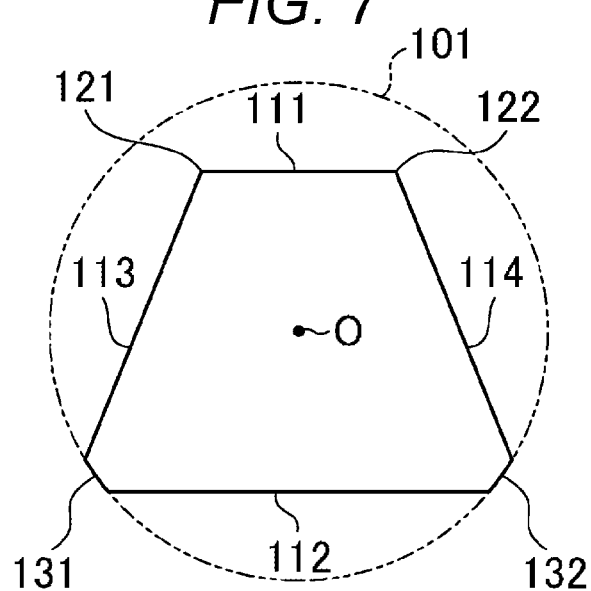
FIG. 7 is a cross-sectional view, in a third embodiment, illustrating a vicinity of a leading end of a working portion 100a of FIG. 1.

The above-described trapezoidal shapes may not be identical along the entire length of the working portion 100a. For example, as illustrated in FIG. 7, a cross-sectional shape around vertexes at both ends of the lower bottom 112 may be formed such that land portions 131 and 132 along the circular arc of the imaginary circle 101 remain in a prescribed range of the leading end portion of the working portion 100a. That is, the land portions 131 and 132 along the circular arc of the imaginary circle 101 may be disposed around the vertexes at both ends of the lower bottom 112. When such a cross-sectional shape is formed, for example, the sense of being pulled in can be easily reduced thereby to enhance root canal following properties, even when the dental file 100 is a rotary file.

Fourth Embodiment

Figure 5:
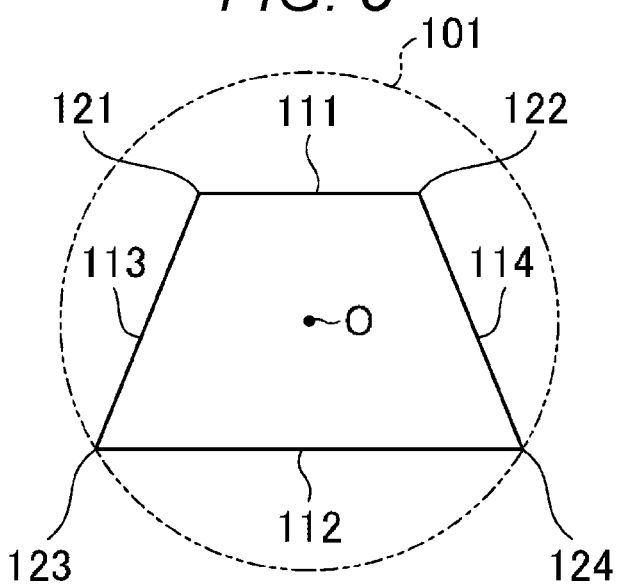
FIG. 5 is a cross-sectional view along line V-V of FIG. 1.
Figure 8:
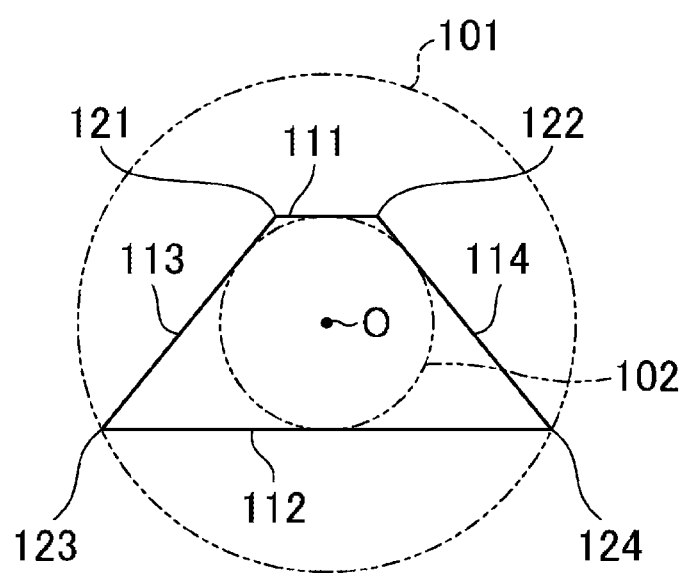
FIG. 8 is a view, in a fourth embodiment, corresponding to the cross section along line V-V of FIG. 1.

A dimension of each side and angles of the trapezoidal shape may differ between the base end portion side and the leading end portion side of the working portion 100a. Specifically, for example, the cross-sectional shape of the working portion 100a may be formed into the shape illustrated in FIG. 5 around the leading end portion of the working portion 100a and into the shape illustrated in FIG. 8 around the base end portion. That is, as illustrated in FIG. 5 and FIG. 8, an angle formed between a diameter including the vertex 123 of the imaginary circle 101 and the lower bottom (bottom side) 112 and an angle formed between a diameter including the vertex 124 of the imaginary circle 101 and the oblique side 114 are set so as to be larger in the leading end portion (FIG. 5) than in the base end portion (FIG. 8). Accordingly, when a counterclockwise direction is set to the main rotation direction in FIG. 8, proper cutting properties are maintained while torsional rigidity is enhanced, around the leading end portion of the dental file 100. That is, a so-called nerve can be imparted around the leading end portion of the dental file 100. Therefore, a rotation force can be easily transferred to the leading end portion. Also, the dental file 100 having high cutting properties, flexibility, and discharge properties from the leading end portion to the base end portion can be easily formed.

Here, in usual use of the dental file 100, a rotation direction in which cut chips in the working portion 100a are conveyed toward the base portion is set to the main rotation direction. That is, specifically, for example, when the spiral of the dental file 100 is a right-hand screw, a counterclockwise direction when seen from the leading end side is set to the main rotation direction. When the dental file 100 rotates in such a direction, the lower bottom 112 exerts a cutting action at the vertex 123 while the oblique side 114 exerts a cutting action at the vertex 124, with the rotation of the dental file 100. It is noted that the rotation direction of the dental file 100 is not limited to the above-described direction. The dental file 100 may be used in a mode which includes a reverse rotation or in a mode which alternates rotation directions.

It is noted that when a clockwise direction is set to the main rotation direction in FIG. 8, an angle formed between a diameter including the vertex 123 of the imaginary circle 101 and the oblique side 113 and an angle formed between a diameter including the vertex 124 of the imaginary circle 101 and the lower bottom 112 are set to be larger in, for example, the leading end portion (FIG. 5) than in the base end portion (FIG. 8). Accordingly, the same operations and effects as those described about the case in which a counterclockwise direction is set to the main rotation direction can also be obtained. Also, the above-described angle setting may be made for only one of the vertexes 123 and 124.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A dental file comprising a working portion having a spiral shape, wherein
each of cross sections perpendicular to a longitudinal direction of the working portion has a trapezoidal shape including an upper bottom, a lower bottom, and first and second oblique sides,
vertexes at both ends of the lower bottom are located on an imaginary circle of each of the cross sections having a center at an axis in the longitudinal direction of the working portion,
vertexes at both ends of the upper bottom are located inside the imaginary circle of each of the cross sections,
the imaginary circle of each of the cross sections has a diameter decreasing from a base end portion toward a leading end portion of the working portion, and
in each of the cross-sections of the working portion, a shortest distance from the center of the imaginary circle to the upper bottom of the trapezoidal shape, a shortest distance from the center of the imaginary circle to the lower bottom of the trapezoidal shape, a shortest distance from the center of the imaginary circle to the first oblique side of the trapezoidal shape, and a shortest distance from the center of the imaginary circle to second oblique side of the trapezoidal shape are equal to each other.

2. The dental file according to claim 1, wherein
in the leading end portion of the working portion, the trapezoidal shape includes land portions along a circular arc of the imaginary circle around the vertexes at both ends of the lower bottom.

3. The dental file according to claim 1, wherein
an angle of each of the cross sections formed between the diameter, of the imaginary circle of each of the cross sections, including at least one of the vertexes of both ends of the lower bottom and the first or second oblique side of each of the cross sections becomes wider from the base end portion toward the leading end portion of the working portion.

4. The dental file according to claim 3, wherein
an angle of each of the cross sections formed between the diameter, of the imaginary circle of each of the cross sections, including at least one of the vertexes of both ends of the lower bottom and the first or second oblique side of each of the cross sections becomes wider from the base end portion toward the leading end portion of the working portion.

* * * * *